No. 612,490. Patented Oct. 18, 1898.
D. W. DURBIN & H. L. CRUM.
NUT LOCK.
(Application filed May 19, 1897.)
(No Model.)
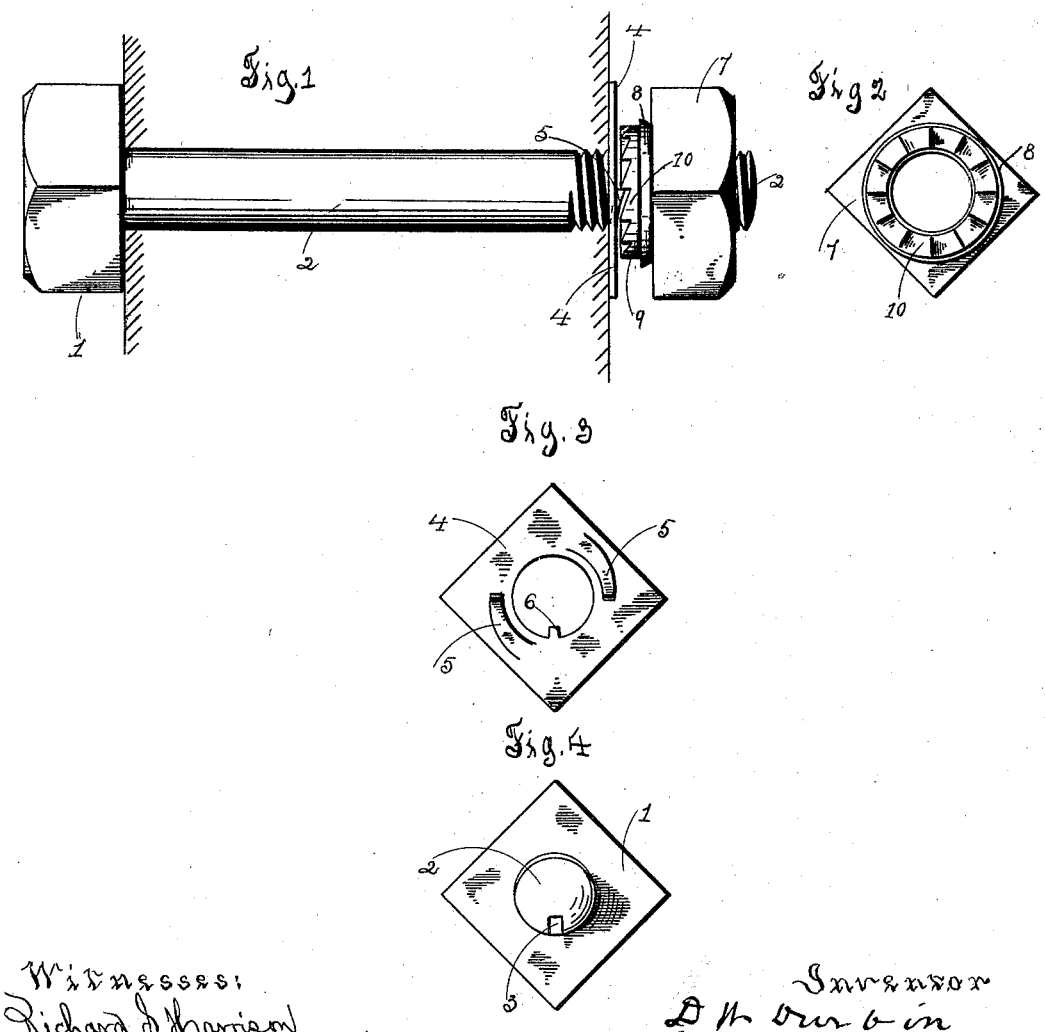

UNITED STATES PATENT OFFICE.

DAVID W. DURBIN AND HARRY L. CRUM, OF BRIDGEVILLE, PENNSYLVANIA; SAID DURBIN ASSIGNOR OF ONE-HALF OF HIS RIGHT TO NORMAN W. CHEEKS, OF SAME PLACE.

NUT-LOCK.

SPECIFICATION forming part of Letters Patent No. 612,490, dated October 18, 1898.

Application filed May 19, 1897. Serial No. 637,282. (No model.)

*To all whom it may concern:*

Be it known that we, DAVID W. DURBIN and HARRY L. CRUM, citizens of the United States of America, residing at Bridgeville, in the county of Allegheny and State of Pennsylvania, have invented certain new and useful Improvements in Nut-Locks, of which the following is a specification, reference being had therein to the accompanying drawings.

This invention relates to certain new and useful improvements in a nut-and-bolt lock.

The invention has for its object the provision of a means whereby the nut upon the bolt is prevented from unscrewing.

With the above object in view the invention finally consists of the novel construction, combination, and arrangement of parts to be hereinafter more specifically described.

In describing the invention in detail reference is had the accompanying drawings, forming a part of this specification, and wherein like figures of reference indicate similar parts throughout the several views, in which—

Figure 1 is a horizontal side view of our improved nut-and-bolt locking device. Fig. 2 is a face view of the inner side of the nut. Fig. 3 is a face view of the washer. Fig. 4 is a view of the bolt locking from the stem or shank end.

Referring to the drawings, the bolt-head is designated as 1 and the shank portion thereof as 2, and which has formed parallel therewith and extending along its threaded portion the groove 3. The washer 4, which is constructed of thin sheet spring metal, such as steel, has formed within its face the pawls 5, which are constructed by cutting radial-shaped slits within the face of the washer and then slightly turning the free end in an outward direction.

The small integral piece 6, which is formed within the opening of the washer, is adapted to engage within the groove of the bolt to prevent the washer from turning upon the bolt. Upon the inner face of the said nut 7 is formed the flange portion 9, which is provided with the ratchet-teeth 10. Surrounding the said flange 9 is another flange 8 of larger diameter and provided with the beveled portion 8'.

The operation of the device is as follows:

The bolt 2 being placed in position, the washer 4 is placed upon the bolt with the integral projecting piece in the bolt-slot 3. The nut is then screwed on the bolt until the toothed portion is brought into engagement with the pawls upon the washer, and the device is thereby locked.

With a view of affording more secure means for locking the device we have made the washer 4 considerably larger than the said flanged portions, whereby its ends may be bent down over the beveled portion 8' of the flange 8.

Slight variations may be made in the detail parts of the invention without departing from the general spirit of the same.

Having thus fully shown and described our invention, what we claim as new, and desire to secure by Letters Patent, is—

1. A nut-lock consisting of the bolt, the threaded portion of which is provided with a slot, a washer provided with an integral projection adapted to enter the said slot, spring-pawls formed upon the said washer, and a nut provided with the flange portions 8 and 9, the face of the said flange portion 9 being provided with teeth adapted to be engaged by the said pawls upon the said washer, substantially as shown and described.

2. A nut-lock consisting of the bolt, the threaded portion of which is provided with a slot, a washer provided with a projection adapted to enter the said slot, pawls formed upon the said washer, and a nut provided with the flanged portions 8 and 9, the said flange 9 being provided with teeth adapted to be engaged by the said pawls upon the washer, the said flange 8, being of larger diameter than the flange 9, and provided with the beveled portion 8', upon which the corners of the said washer are adapted to be bent, substantially as shown and described.

In testimony whereof we affix our signatures in presence of two witnesses.

DAVID W. DURBIN.
HARRY L. CRUM.

Witnesses:
E. E. FULMER,
HOWARD ZACHARIAS.